US 8,448,160 B2

(12) United States Patent
Vincent et al.

(10) Patent No.: US 8,448,160 B2
(45) Date of Patent: May 21, 2013

(54) APPLICATION PROGRAMMING INTERFACE FOR IDENTIFYING, DOWNLOADING AND INSTALLING APPLICABLE SOFTWARE UPDATES

(75) Inventors: Joshuah Vincent, Seattle, WA (US); Korukonda Naveen Kumar, Ponduru (IN); Chung Yiu Chow, Kirkland, WA (US); Kenneth A. Showman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/178,356

(22) Filed: Jul. 7, 2011

(65) Prior Publication Data
US 2011/0271272 A1 Nov. 3, 2011

Related U.S. Application Data

(63) Continuation of application No. 11/082,326, filed on Mar. 16, 2005, now Pat. No. 7,987,459.

(51) Int. Cl.
*G06F 9/44* (2006.01)
(52) U.S. Cl.
USPC ........... 717/168; 717/169; 717/170; 717/171; 717/172; 717/173
(58) Field of Classification Search
USPC ................................. 717/168–178
See application file for complete search history.

(56) References Cited

U.S. PATENT DOCUMENTS

| | | | |
|---|---|---|---|
| 5,790,796 A | 8/1998 | Sadowsky | |
| 5,920,725 A | 7/1999 | Ma et al. | |
| 6,199,204 B1 | 3/2001 | Donohue | |
| 6,209,128 B1 | 3/2001 | Gerard et al. | |
| 6,314,565 B1 | 11/2001 | Kenner et al. | |
| 6,345,386 B1 | 2/2002 | Delo et al. | |
| 6,389,589 B1 | 5/2002 | Mishra et al. | |
| 6,418,554 B1 * | 7/2002 | Delo et al. | 717/174 |
| 6,523,166 B1 | 2/2003 | Mishra et al. | |
| 7,987,459 B2 | 7/2011 | Chow et al. | |
| 2002/0129017 A1 * | 9/2002 | Kil et al. | 707/6 |
| 2003/0046675 A1 | 3/2003 | Cheng et al. | |
| 2003/0110241 A1 | 6/2003 | Cheng et al. | |
| 2003/0145317 A1 | 7/2003 | Chamberlain | |
| 2005/0132357 A1 | 6/2005 | Shell et al. | |
| 2005/0268297 A1 * | 12/2005 | Kovachka-Dimitrova et al. | 717/171 |

OTHER PUBLICATIONS

Bettini et al. "Software Update via Mobile Agent Based Programming", 2002, ACM, pp. 32-36.
Hicks et al. "Dynamic Software Updating", 2001, ACM, pp. 13-23.
Greschler et al. "Networking Lessons in Delivering 'Software as a Service'—Part II", 2002, International Journal of Network Management, pp. 339-345.
Stoyle et al. "Mutatis Mutandis: Safe and Predictable Dynamic Software Updating", 2005, ACM, pp. 183-194.

\* cited by examiner

*Primary Examiner* — Qamrun Nahar
(74) *Attorney, Agent, or Firm* — Merchant & Gould P.C.

(57) ABSTRACT

An application programming interface (API) provides a set of functions for application developers to build software programs that automatically detect, download, and install desired software updates.

19 Claims, 6 Drawing Sheets

APPLICATION PROGRAMMING INTERFACE FOR IDENTIFYING, DOWNLOADING AND INSTALLING APPLICABLE SOFTWARE UPDATES

RELATED APPLICATIONS

This application is a continuation of, and claims priority to, U.S. patent application Ser. No. 11/082,326, filed on Mar. 16, 2005, (now U.S. Pat. No. 7,987,459, issued Jul. 26, 2011), entitled "APPLICATION PROGRAMMING INTERFACE FOR IDENTIFYING, DOWNLOADING, AND INSTALLING APPLICABLE SOFTWARE UPDATES."

FIELD OF THE INVENTION

The present invention relates to computer software and, in particular, to an application programming interface.

BACKGROUND OF THE INVENTION

Most software products undergo a continual revision process to repair or update features of the software. Each revision of a software product frequently requires adding new files, replacing existing files with newer revisions, deleting obsolete files, or various combinations of these actions. This process of replacing older files, adding new files, and deleting obsolete files of a software product is usually referred to as "updating the product." The data collection, including binary files, data files, update instructions, metadata, and the like, used in updating the product is usually referred to as a "software update" or more simply as an "update."

Once a software provider has created an update for a software product, either to fix a problem, enhance security, or add new features, the software provider will want to make that update widely available to its customer base. Quite often, such as when the update is directed at correcting a flaw in the product or addressing a critical security issue, the software provider will want that update installed on the customers' computers as soon as possible. Indeed, most software providers have a business incentive to distribute software updates to their customers as quickly and in as trouble-free a manner as possible.

However, a customer of a software product may not easily discover that his or her software product needs one or more specific updates. Generally, an update can be deployed through a Web site, or through media such as a CD. A customer may download and install the update from the Web site or the media. However, these mechanisms do not enable a customer to easily discover what updates are applicable to the software product.

Therefore, there exists a need for automatically identifying one or more updates that are applicable to a software product. Furthermore, it is desirable to automatically download one or more updates that a customer selects to download. It is also desirable to automatically install one or more updates that a customer selects to install.

SUMMARY OF THE INVENTION

The invention addresses the above-identified needs by providing a set of application programming interfaces (hereinafter "API"). The API enables an application developer to identify, download, and install software updates meeting one or more criteria.

One aspect of the invention provides a software architecture for a distributed computing system. The software architecture includes one or more software programs configured to access software updates existing in the distributed computing system. A software program can be an operating system or a software application that performs a specific task for a computer user. The software architecture further includes the above-mentioned API, which presents functions used by a software program to access the software updates. Preferably, the distributed computing system includes one or more client devices and one or more server devices, wherein a server device handles a request from a client device for accessing the software updates.

In accordance with another aspect of the invention, a computing system, including one or more data processors and one or more software programs, is provided. The one or more software applications utilize the API to access software updates.

The API provides multiple groups of services for searching, downloading, and installing software updates applicable to a software program. For example, the API includes a first group of services related to searching, downloading, and installing software updates. The first group of services includes services for searching software updates that meet one or more criteria. A criterion may identify a property of an update, such as the type of an update or the name of an update. The search services may provide functions concerning a software update, the history of a software update, and an exception generated by a software update. The search services may also provide functions concerning properties of a software update such as the category of a software update, and/or the download size of one or more software updates. The first group of services further includes services for downloading one or more of the found software updates. The first group of services also includes a group of services for installing one or more of the downloaded software updates, and/or for un-installing one or more of the downloaded software updates that have been installed previously. The first group of services may also include services related to accessing software updates on the Internet.

Preferably, the API also includes a second group of services for automatically installing or un-installing software updates. Such services may notify a user upon the occurrence of an automatic installation or un-installation of software updates. Preferably, the API further includes a third group of services for providing data about a client device that requests one or more software updates. Such information includes, for example, the hardware configuration and system reboot requirements of the client device. Preferably, the API also includes a fourth group of services for identifying one or more services, from which a software program may access available software updates.

In summary, the invention provides an API that enables an application developer to identify, download, and install software updates meeting specific requirements. As a result, scripts or software programs can be written to identify software updates that are currently available for a computing system, to download, and to install such updates. The API can be used to scan for updates suitable for a local computer. System administrators can use the API to programmatically determine what updates should be applied to a computer, download these updates, and install them with little or no user intervention. Application developers can also integrate features provided by the API into computer update management software to provide a seamless operating environment.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the invention provide an API that enables an application developer to identify, download, and install or un-install software updates that meet specific criteria. More specifically, the API enables an application developer to identify available software updates that meet specific criteria. Such software updates can exist on the Internet or a local network. The API also enables an application developer to automatically download software updates. The API also enables an application developer to install or un-install updates. Preferably, the API enables an application developer to automatically install or un-install updates and/or to notify a user of an automatic event. Preferably, the API also enables an application developer to obtain information about the hardware configurations and the system reboot requirements of a client device that requests access to software updates. The API may also enable an application developer to identify one or more services through which a software program can access available software updates.

Figure 1:
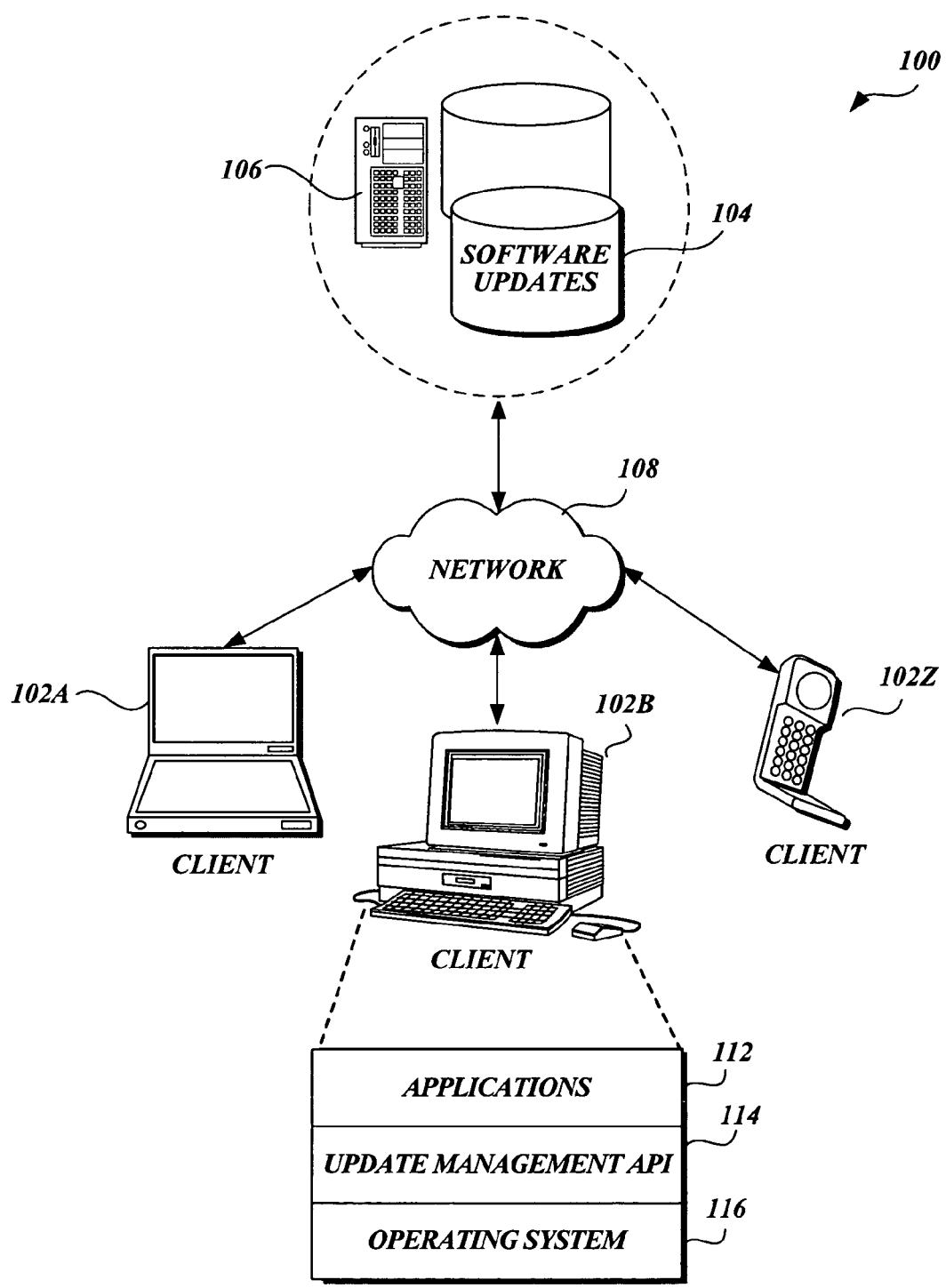
FIG. 1 is a block diagram illustrating an exemplary computing architecture in which software programs in client devices access software updates over the Internet, using an update management API.

FIG. 1 illustrates an exemplary computing architecture 100 in which software programs in different client devices access available software updates using an update management API. The illustrated computing architecture 100 includes a variety of client devices such as the representative client devices 102A, 102B, . . . , and 102Z, which provide various computing functionalities. The client devices 102A-102Z can be implemented in different ways. For example, as illustrated in FIG. 1, the client devices 102A-102Z include laptop 102A, personal computer 102B, and mobile telephone 102Z. To illustrate, the client devices 102A-102Z should be considered as exemplary and not limiting. A client device may be any one of a number of computing devices, including, but not limited to, tablet personal computers, handheld computing devices, personal digital assistants, mobile telephones, standard long memory devices, electronic devices having some type of memory, and the like.

The computing architecture 100 also includes one or more software updates 104. The software updates may be associated with a server 106 on a network 108. The computing architecture 100 may include one or more servers 106, through which a client device queries and/or accesses available software updates. The client devices 102A-102Z access the software updates 104 through the network 108. The client devices 102A-102Z may communicate with each other through the network 108 using standard network protocols.

The network 108 may be a Local Area Network (LAN) or a larger network, such as a Wide Area Network (WAN) or the Internet.

As known to those skilled in the art and others, the computing architecture 100 may be configured to exchange documents, commands, and other types of data among the computing devices 102A-102Z. As will be appreciated by those skilled in the art and others, the computing architecture 100 shown in FIG. 1 is a simplified example of one system suitable for implementing embodiments of the invention.

As shown in FIG. 1, a client device such as the representative client device 102B contains one or more applications 112, an update management API 114, and an operating system 116. An application 112 or an operating system 116 can also be called a software program. As known by those skilled in the art, an application 112 is any software program designed to perform a specific task for a computer user such as solving a mathematical equation or supporting word processing. An operating system 116 is a software program that manages and controls the hardware of the client device 102B. The goal of an operating system 116 is to make the computing resources available to an application developer, while at the same time hiding the complexity necessary to actually control the computing resources. In general, an operating system such as the operating system 116 makes computing resources available to an application via functions that are collectively known as an application programming interface or API. Conventionally, the term API is also used in reference to a single one of these functions. The functions are often grouped in terms of what resource or service they provide to an application developer. An application requests resources by calling individual API functions. API functions also serve as the means by which messages and information provided by the operating system are relayed back to the application software. Embodiments of the invention provide a set of updated management API 114 that enables an application 112 to identify software updates 104 applicable to a client device 102B. Upon identifying such software updates 104, the update management API 114 also enables an application 112 to download, and install or un-install such software updates. The update management API 114 only exposes read-only functionality on a target device such as the server 106. The update management API 114 does not allow an application such as the application 112 to modify the state of a target device.

Figure 2:
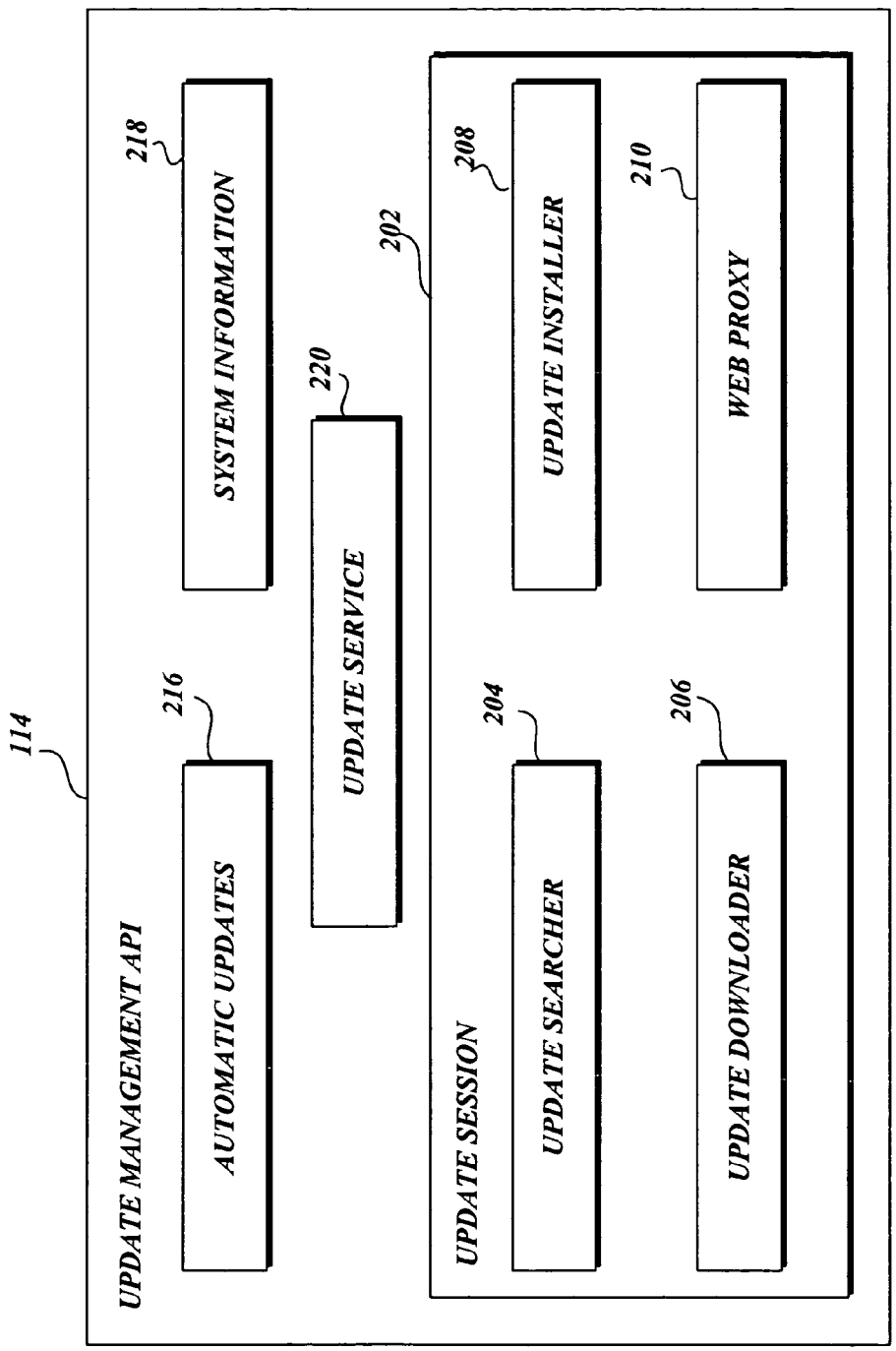
FIG. 2 is a block diagram illustrating an exemplary embodiment of an update management API for accessing software updates.

More specifically, the update management API 114 represents groups of functions that an application 112 can call to search, download, and install or un-install software updates applicable to a client device 102B. FIG. 2 illustrates exemplary groups of functions in the update management API 114. These groups of functions can also be called namespaces. A namespace essentially defines a collection of classes, interfaces, delegates, enumerations, and structures that provide a specific set of related functionalities. As known by those skilled in the related art, a class is a blueprint of an object, which comprises data structures and methods for operating on a particular set of data. An interface describes how a user of a class may interact with the class. A delegate is an object-oriented function pointer. An enumeration is a special kind of value type that represents named constants. A structure represents static allocated data that has value assignment semantics.

As shown in FIG. 2, the updated management API 114 includes multiple exemplary namespaces: an Update Session namespace 202, an Automatic Updates namespace 216, a System Information namespace 218, and an Update Service namespace 220. The Automatic Updates namespace 216 enables an application developer to begin, pause, or resume automatic installation of updates on a client device. The Automatic Updates namespace 216 may include a class that obtains information on or configures the day and the time to automatically install updates; this class may also specify how to notify a user of an automatic update event. The System Information namespace 218 provides information about hardware and system reboot requirements on the client device. The Update Service namespace 220 provides information about one or more services that have registered to provide an application access to available software updates.

Figure 3A:
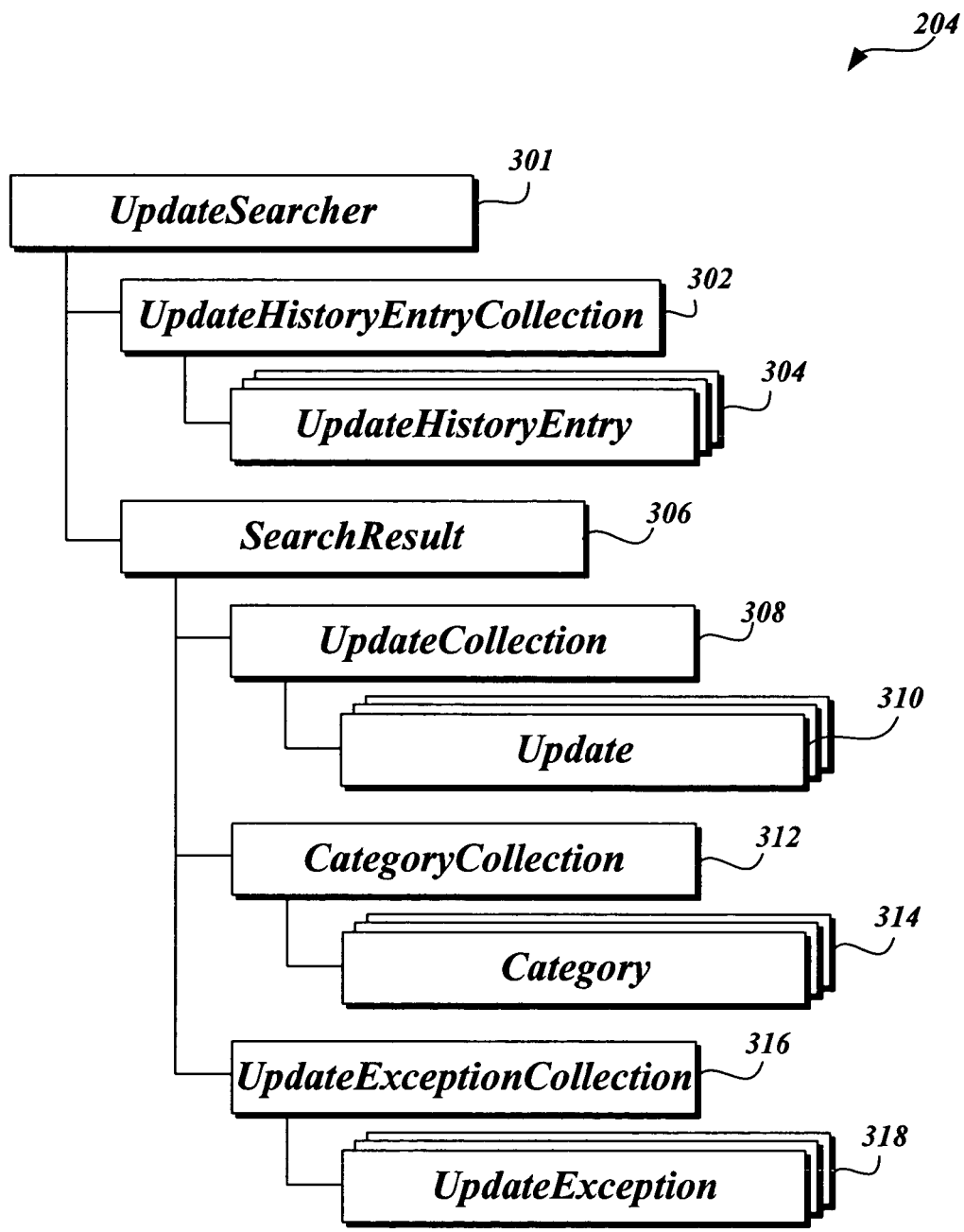
FIGS. 3A-3C are block diagrams illustrating exemplary components of the update management API illustrated in FIG. 2.
Figure 3B:
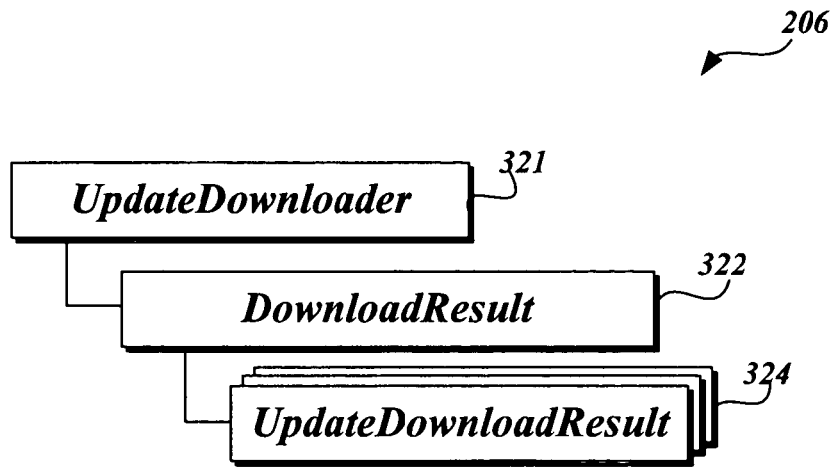
Figure 3C:
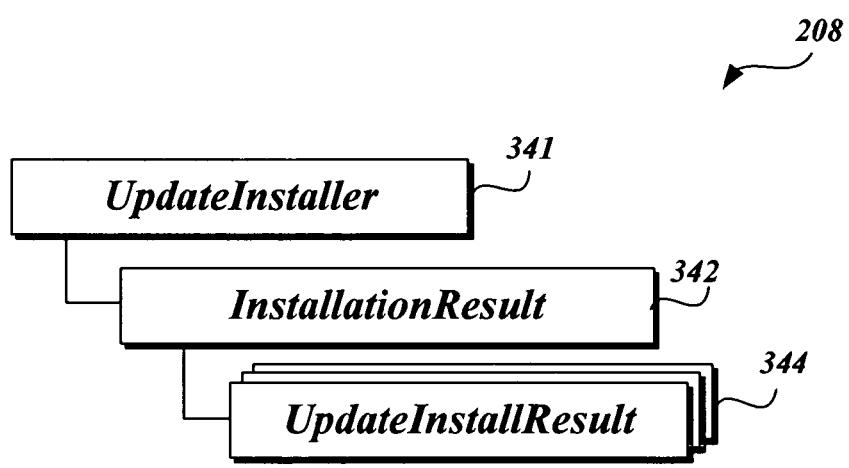

The Update Session namespace 202 provides functionalities to start a session to search, download, and install/un-install updates for an application such as the application 112 illustrated in FIG. 1. The Update Session namespace 202 includes multiple sub-namespaces such as Update Searcher 204, Update Downloader 206, Update Installer 208, and Web Proxy 210. The Web Proxy 210 namespace contains one or more classes enabling an application developer to obtain and configure Web Proxy settings that provide a client device access to the Internet. FIGS. 3A-3C illustrate, in detail, the other exemplary three sub-namespaces included in the Update Session namespace 202, i.e., the Update Searcher namespace 204, the Update Downloader namespace 206, and the Update Installer namespace 208, respectively.

As shown in FIG. 3A, an Update Searcher namespace 204 contains multiple classes that enable an application developer to search for updates applicable to a client device such as the client device 102B illustrated in FIG. 1. For example, the Update Searcher namespace 204 includes an Update Searcher class 301 that enables an application developer to search, synchronously or asynchronously, for updates matching one or more criteria such as the type of update, the ID of the update, or the category of the update. The Update Searcher namespace 204 may include an UpdateHistoryEntryCollection class 302, the object of which provides access to multiple objects of an UpdateHistoryEntry class 304. The UpdateHistoryEntry object 304 provides information about an update that has been installed or un-installed previously on a client device, through the use of the update management API 114.

Such an update may no longer be applicable to the client device. Information provided by the UpdateHistoryEntry object 304 includes, for example, the application that processed the update, date of the installation or un-installation, and description of the update.

The Update Searcher namespace 204 may also include a SearchResult class 306. An object of the SearchResult class 306 includes information about the result of a search for categories or updates. Such an object provides a collection of categories found on the client device by a search. Such an object also provides a collection of updates found on the client device through a search. In an exemplary embodiment of the invention, an object of the SearchResult class 306 may provide an object of an UpdateCollection class 308. An object of the UpdateCollection class 308 provides access to multiple objects of an Update class 310. An object of the Update class 310 provides information concerning an individual update. Such information may include the identity of the update, description of the update, un-install options for the update, download priority of the update, size of the update, and expiration date of the update. For example, an update may have a normal or higher priority for a download operation. In addition, an object of the SearchResult class 306 may provide an object of a CategoryCollection class 312. An object of the CategoryCollection class 312 provides access to multiple objects of a Category class 314. An object of the Category class 314 provides information about the category of an update. Such information includes the name, ID, description, owner, and intended product of the category. An object of the Category class 314 may also provide a collection of updates that belong to this particular category. An object of the Category class 314 may also provide a collection of the parent categories or the children categories of this particular category. In addition, an object of the SearchResult class 306 may also provide an object of an UpdateExceptionCollection class 316, which provides access to multiple objects of an UpdateException class 318. An object of the UpdateException class 318 provides the description and the context of an exception that is generated when an update error occurs.

FIG. 3B illustrates an exemplary Update Downloader namespace 206 that provides multiple classes for downloading software updates. For example, an UpdateDownloader class 321 is provided to enable asynchronous or synchronous download of files associated with updates that are to be downloaded.

An object of an UpdateDownloader class 321 may provide an object of the DownloadResult class 322, which provides information about the result of a download. An object of the DownloadResult class 322 may provide access to multiple objects of an UpdateDownloadResult class 324; each of the multiple objects provides information about the result of the download for an individual update.

FIG. 3C illustrates an exemplary Update Installer namespace 208 that provides one or more classes for installing or un-installing software updates. For example, an UpdateInstaller class 341 is provided to start an asynchronous or synchronous installation or un-installation of an update. Preferably, an object of the UpdateInstaller class 341 also starts an interactive dialogue sequence that guides a user through the steps for installing or un-installing one or more updates. As shown in FIG. 3C, an object of the UpdateInstaller class 341 may provide an object of an InstallationResult class 342. An object of the InstallationResult class 342 provides information about the result of an installation or un-installation. An object of the InstallationResult class 342 may also determine whether a system reboot is required to complete the installation or un-installation of updates on a client device. In embodiments of the invention, an object of the InstallationResult class 342 may also provide access to multiple objects of an UpdateInstallResult class 344, which provides information about the result of the installation or un-installation for an individual update.

Figure 4:
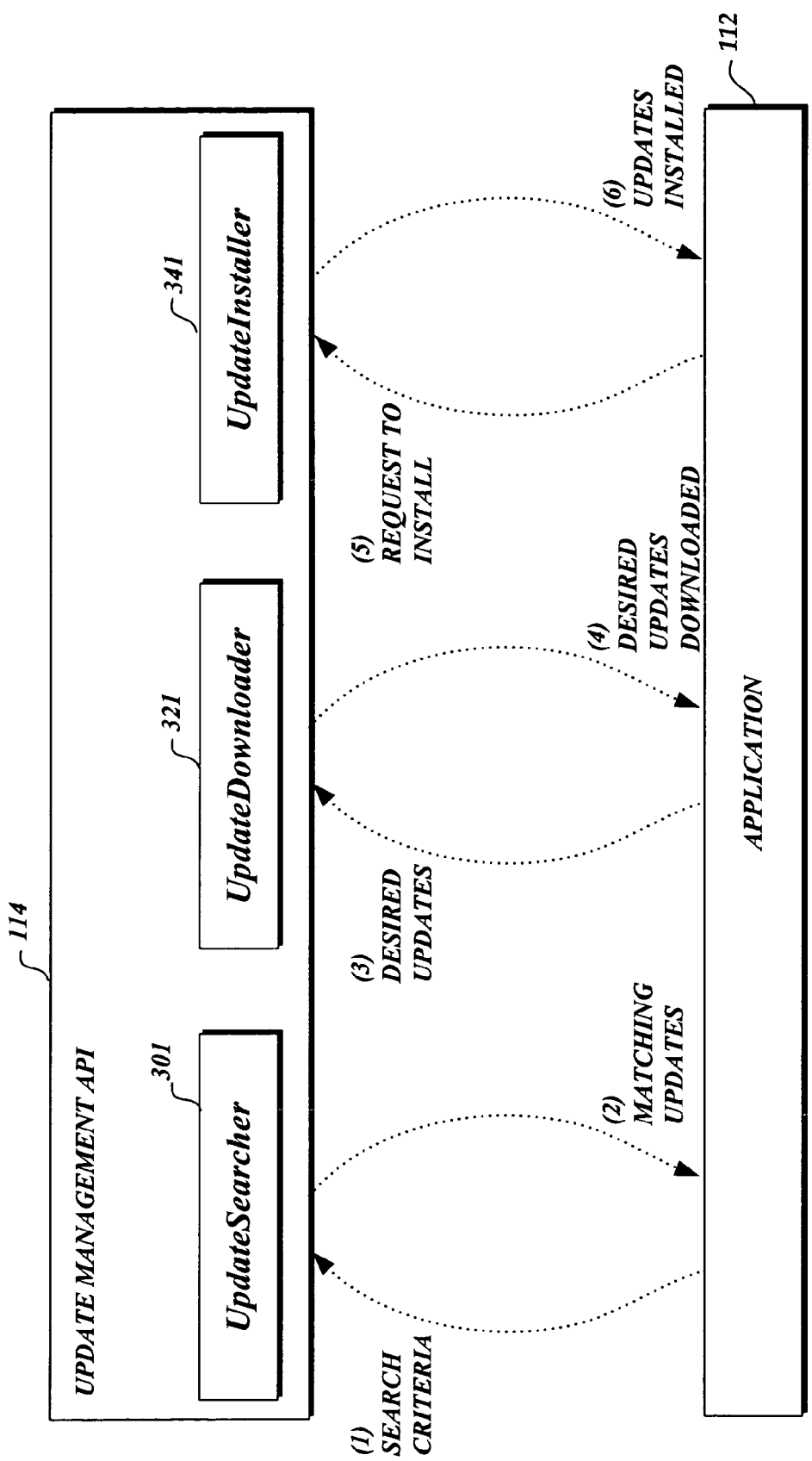
FIG. 4 is a block diagram illustrating an application's exemplary use of the exemplary components of the update management API illustrated in FIG. 3.

FIG. 4 is a block diagram illustrating how an application 112 uses the update management API 114 to search, download, and install one or more updates on a client device, such as the client device 102B illustrated in FIG. 1. As shown in FIG. 4, the application 112 provides a set of search criteria to an object of the UpdateSearcher class 301. The object of the UpdateSearcher class 301 searches available updates using the search criteria, and builds an object of the SearchResult class 306 that includes updates that match the search criteria. The object of the UpdateSearcher class 301 then returns the object of the SearchResult class 306 to the application 112.

Preferably, a user interface is provided so that a user can enter the search criteria. The user interface may also show the user the collection of updates contained in the object of the SearchResult class 306. The user may select the updates to be downloaded, i.e., the desired updates. The application 112 then may send information about the desired updates to an object of the UpdateDownloader class 321. Preferably, the desired updates will be contained in an object of the UpdateCollection class 308. The object of the UpdateDownloader class 321 then downloads the required files for the desired updates from the server 106, constructs and returns an object of the DownloadResult class 322 that contains the download result for each of the desired updates. The user interface then may present a list of the downloaded updates to the user, and let the user choose when to install them. Sometimes, one or more of the downloaded updates may have been installed on the application 112 previously. Preferably, a user may also select to un-install one or more of the downloaded updates.

Once a user selects to install one or more of the downloaded updates, the application 112 creates an object of the UpdateInstaller class 341, passing it information about the updates to be installed. The object of the UpdateInstaller class 341 then installs each requested update, constructs and returns an object of the InstallationResult class 342 that provides details of the installation result for each requested update.

Figure 5:
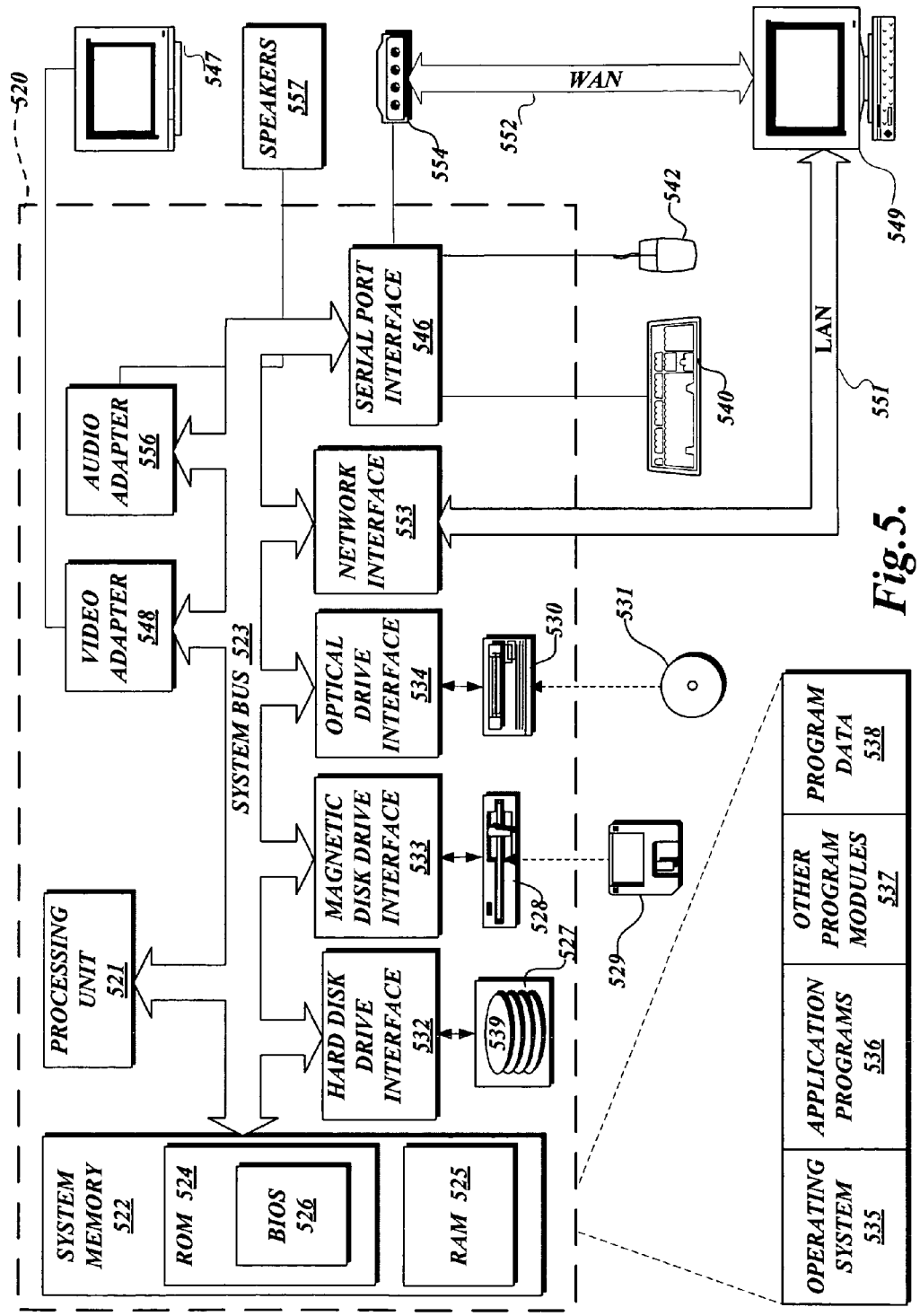
FIG. 5 is a block diagram illustrating an exemplary computer that may execute all or part of the invention.

FIG. 5 and the following discussion are intended to provide a brief and general description of a suitable computing environment in a client device in which the invention may be implemented.

Although not required, the invention will be described in the context of computer-executable instructions, such as program modules, being executed by a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. As noted above, the invention may also be practiced in distributed computing environments where tasks are performed by remote processing devices that are linked through a communications network. In a distributed computing environment, program modules may be located in both local and remote memory storage devices.

It should be further understood that the present invention may also be applied in the context of accessing software updates on the Internet via a browser; thus, the present invention may apply to much lower-end devices that may not have many of the components described in reference to FIG. 5 (e.g., hard disks, etc.).

With reference to FIG. 5, an exemplary system for implementing the invention includes a general purpose computing device in the form of a conventional personal computer 520. The personal computer 520 includes a processing unit 521, a system memory 522, and a system bus 523 that couples various system components including the system memory to the processing unit 521. The system bus 523 may be any of several types of bus structures, including a memory bus or memory controller, a peripheral bus, and a local bus using any of a variety of bus architectures. The system memory includes read only memory (ROM) 524 and random access memory (RAM) 525. A basic input/output system 526 (BIOS), containing the basic routines that help to transfer information between elements within the personal computer 520, such as during start-up, is stored in ROM 524.

The personal computer 520 further includes a hard disk drive 527 for reading from and writing to a hard disk 539, a magnetic disk drive 528 for reading from or writing to a removable magnetic disk 529, and an optical disk drive 530 for reading from or writing to a removable optical disk 531, such as a CD-ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of computer-readable instructions, data structures, program modules, and other data for the personal computer 520.

Although the exemplary environment described herein employs a hard disk 539, a removable magnetic disk 529, and a removable optical disk 531, it should be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk 539, magnetic disk 529, optical disk 531, ROM 524, or RAM 525, including an operating system 535, one or more application programs 536, other program modules 537, and program data 538. For example, the application programs 536 may comprise the application 112 illustrated in FIG. 1.

A user may enter commands and information into the personal computer 520 through input devices, such as a keyboard 540 and pointing device 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port, or a universal serial port (USB). A monitor 547 or other type of display device is also connected to the system bus 523 via an interface, such as a video adapter 548. In addition to the monitor, personal computers typically include other peripheral output devices (not shown), such as speakers and printers.

The personal computer 520 may operate in a networked environment using logical connections to one or more remote computers, such as a remote computer 549. The remote computer 549 may be another personal computer, a server, a router, a network PC, a peer device, or other common network node, and typically includes many or all of the elements described above relative to the personal computer 520, although only a memory storage device has been illustrated in FIG. 5. The logical connections depicted in FIG. 5 include a local area network (LAN) 551 and a wide area network (WAN) 552. Such networking environments are commonplace in offices, enterprise-wide computer networks, Intranets, and the Internet.

When used in a LAN networking environment, the personal computer 520 is connected to the local network 551 through a network interface or adapter 553. When used in a WAN networking environment, the personal computer 520 typically includes a modem 554 or other means for establishing communications over the wide area network 552, such as the Internet. The modem 554, which may be internal or external, is connected to the system bus 523 via the serial port interface 546. In a networked environment, program modules depicted relative to the personal computer 520, or portions thereof, may be stored in the remote memory storage device. It will be appreciated that the network connections shown are exemplary, and other means of establishing a communications link between the computers may be used.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A software architecture for a distributed computing system, the architecture for searching for, downloading, and installing software updates, the architecture being encoded upon one or more computer-readable media, and the architecture comprising:
- a program configured to access software updates existing in the distributed computing system, the program comprising:
  - a first object receiving a set of search criteria from a requestor;
  - the first object adapted to build a second object, which comprises updates matching the search criteria;
  - the first object adapted to return the second object to the requestor, wherein the second object provides a third object of a category-collection class and a fourth object of an update-exception-collection class, the third object providing access to a plurality of objects of a category class and the fourth object providing a context of an exception when an update error occurs.

2. The software architecture in claim 1, wherein the distributed computing system comprises one or more client devices and one or more server devices that handle a request from at least one of the one or more client devices for accessing the software updates.

3. The software architecture of claim 1, wherein the program includes an application programming interface (API) to present functions used by an application to access the software updates, and wherein the API includes an first namespace that comprises an update-history-entry-collection class and an update-history-entry class, and wherein an object of the update-history-entry class provides information about an update which has previously been installed or which has previously been uninstalled on a client device.

4. The software architecture of claim 3, wherein the first namespace comprises a synchronization class that enables searching for updates both synchronously and asynchronously.

5. The software architecture of claim 1, wherein the set of criteria comprises:
- a history of a software update;
- an ID of the software update;
- a category of the software update, and
- an exception generated for the software update.

6. The software architecture of claim 1 further comprising:
- the second object providing a collection of updates found through a search;
- the second object providing a fifth object providing access to a plurality of update objects; and
- each of the plurality of update objects providing information concerning an individual update.

7. The software architecture of claim 6 wherein the information concerning an individual update comprises an identity of the update, a description of the individual update, uninstall options for the individual update, a download priority of the individual update, a size of the individual update, and an expiration date for the individual update.

8. An application programming interface embodied on one or more computer-readable media, comprising a group of services related to searching, downloading, and installing software updates, the API comprising:
- a first namespace adapted to provide a session to access the software updates, a second namespace adapted to automatically begin a software update process, an third namespace adapted to provide information about at least one service that provides the software updates, a fourth namespace adapted to search for the software updates, a fifth namespace adapted to download the software updates to a requestor, and a sixth namespace adapted to install the software updates;

wherein the fourth namespace comprises a search-result class, and wherein an object of the search-result class provides an object of a category-collection class and an object of an update-exception-collection class, the category-collection object providing access to a plurality of objects of a category class and the update-exception-collection object providing a context of an exception when an update error occurs.

9. The application programming interface of claim 8, wherein the group of services includes:
- a first group of services related to searching software updates that meet one or more criteria;
- a second group of services related to downloading one or more of the software updates; and
- a third group of services related to installing one or more of the downloaded software updates.

10. The application programming interface of claim 9, wherein the first group of services related to searching software updates that meet one or more criteria provides services for an item selected from the group consisting of:
- a history of a particular software update;
- an ID of the particular software update;
- a category of the particular software update, and
- an exception generated for the particular software update.

11. The application programming interface of claim 9, wherein the third group of services related to installing one or more of the downloaded software updates further includes services related to un-installing one or more of the downloaded software updates that have been previously installed.

12. The application programming interface of claim 9, wherein the application programming interface further includes a fourth group of services related to accessing software updates on the Internet.

13. The application programming interface of claim 9, wherein the application programming interface further includes a fourth group of services related to automatic installation of software updates.

14. The application programming interface of claim 9, wherein the application programming interface further includes a fifth group of services related to providing data about a client device that requests one or more software updates.

15. The application programming interface of claim 9, wherein the application programming interface further includes a sixth group of services related to providing information about one or more services through which a software program accesses available software updates.

16. A method of providing software updates, the method comprising the following steps:
- receiving, by a first object, a set of search criteria from a requestor;
- building, by the first object, a second object, the second object comprising updates matching the search criteria;
- returning, by the first object, the second object to the requestor, wherein the second object provides a third object of a category-collection class and a fourth object of an update-exception-collection class, the third object providing access to a plurality of objects of a category class and the fourth object providing a context of an exception when an update error occurs.

17. The method of claim 16, wherein the set of criteria comprises:
- a history of a software update;
- an ID of the software update;
- a category of the software update, and
- an exception generated for the software update.

18. The method of claim 16 further comprising:
   the second object providing a collection of updates found through a search;
   the second object providing a fifth object providing access to a plurality of update objects; and
   each of the plurality of update objects providing information concerning an individual update.

19. The software architecture of claim 18 wherein the information concerning an individual update comprises an identity of the update, a description of the individual update, uninstall options for the individual update, a download priority of the individual update, a size of the individual update, and an expiration date for the individual update.

* * * * *